United States Patent

[11] 3,579,868

[72] Inventor Thaddeus Leroy Scott
  306 Hyde Drive, Hayward, Calif. 94544
[21] Appl. No. 876,835
[22] Filed Nov. 14, 1969
[45] Patented May 25, 1971

[54] TEST SCORING ANSWER SHEET AND METHOD OF EMPLOYING SAME
  10 Claims, 8 Drawing Figs.
[52] U.S. Cl. .................................................... 35/48,
  235/61.12
[51] Int. Cl. ....................................................... G09b 7/06
[50] Field of Search.......................................... 35/9, 48;
  235/61.111, 61.12, 61.12 (C)

[56] References Cited
UNITED STATES PATENTS

| | | | |
|---|---|---|---|
| 2,353,061 | 7/1944 | Oldenboom | 235/61.12UX |
| 2,528,828 | 11/1950 | Henry | 35/48 |
| 3,171,100 | 2/1965 | Rajchman | 235/61.111X |
| 3,203,116 | 8/1965 | Shaw et al. | 35/48 |

*Primary Examiner*—Jerome Schnall
*Assistant Examiner*—J. H. Wolff
*Attorney*—Harris Zimmerman

ABSTRACT: An answer sheet for automatic test scoring, and scoring method employing same which facilitate automatic scoring with apparatus of an extremely simplified nature and attendant low cost. The sheet and method are such as to eliminate the usual requirement for a master score card and associated comparison circuitry, complex programmed logic circuitry, or the like, in the scoring machine.

PATENTED MAY 25 1971 3,579,868
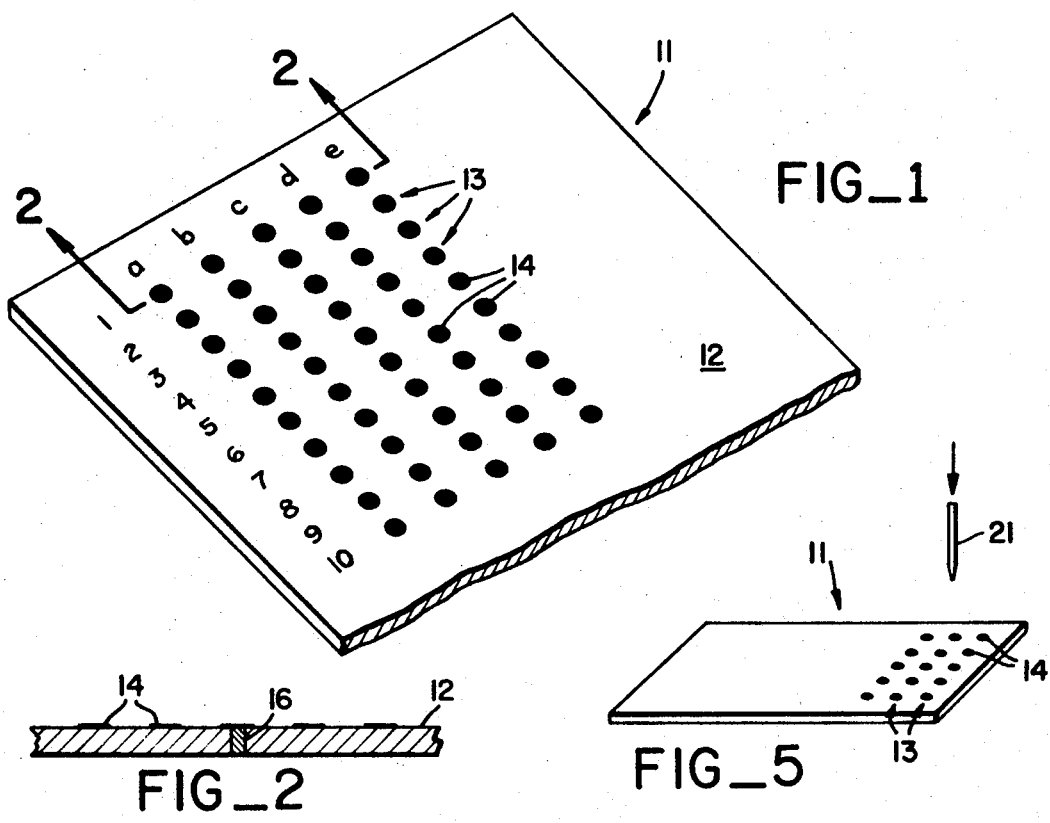
FIG_1
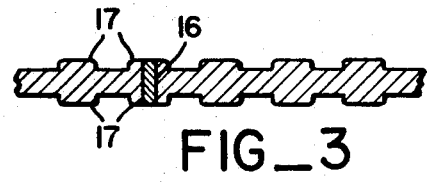
FIG_2
FIG_3
FIG_4
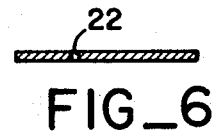
FIG_5
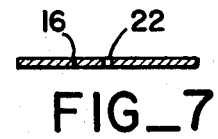
FIG_6
FIG_7
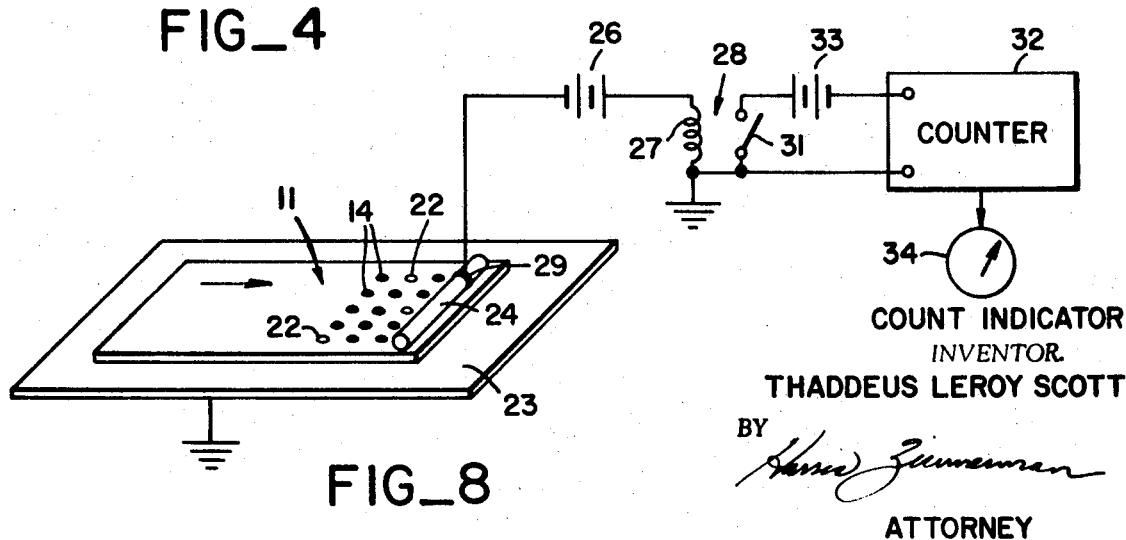
FIG_8
COUNT INDICATOR
INVENTOR.
THADDEUS LEROY SCOTT
BY
ATTORNEY

TEST SCORING ANSWER SHEET AND METHOD OF EMPLOYING SAME

BACKGROUND OF THE INVENTION

Various systems have been developed heretofore for facilitating the high-speed scoring or grading of tests in an automatic or semiautomatic manner. Generally, such systems are based on the use of flat test answer sheet or card having a plurality of preprinted mark indicative areas, certain ones of which a student marks with a suitable marking implement to record the student's choice of answers to certain test questions or problems presented to him from a separate question sheet, or from a teacher. After completion of the test, the marked answer sheets are fed into suitable scoring apparatus arranged to sense the marked areas of the sheet and determine if they correspond to those which are representative of the correct answers. In this manner, the marked answer to each question is determined to be correct or incorrect, and the individual correctness determinations may be automatically totalled to provide a test score.

Conventional automatic scoring systems have been variously arranged to facilitate the sensing of the marked areas of the answer sheet in the scoring apparatus. In one type of system, the answer sheet is provided as a card or sheet of opaque paper, or the like, and the answer marks are in the form of holes punched through the card in the particular mark indicative areas selected by the student. The marks are then read by means of a photoelectric sensor system provided at a reading station of the scoring apparatus, such system being arranged to detect the locations of the holes with the aid of light beams transmitted therethrough upon correspondingly positioned photosensitive devices which generate electrical impulses in response to the light thereby received.

In other types of scoring systems, the selected mark indicative areas of a paper answer sheet are marked by the student with electrically conductive ink. In this case, the sensing system for reading the marks may include electrically conductive feeler members positioned to correspond to the respective mark indicative areas of each question on the answer sheet so as to contact the areas as the sheet is moved through the scoring apparatus. When a feeler member contacts a mark of electrically conductive ink, an electric circuit is closed to thereby generate an electrical signal representative of mark location in accordance with which particular feeler member closes the circuit.

In still another alternative form of scoring system, the mark indicative areas are marked with magnetic ink, rather than conductive ink. The feeler members are then replaced by a stack of magnetic read heads which generate electrical signals in response to the magnetic marks.

With any of the foregoing conventional scoring systems, the sensing system at the reading station of the scoring machine thus serves to generate electrical signals representative of the locations of the areas of the answer sheet marked by the student, and thus of the student's choice of answers to the test questions. Aside from the complexity and cost of the sensing system due to the close registration required between the sensors and mark indicative areas of the answer sheet, it is to be noted that with conventional scoring systems the scoring machine must include a complex comparison arrangement for determining the extent to which the pattern of the sensed mark locations corresponds to that of the correct answers. For example, the comparison arrangement may employ a master answer sheet having the correct answer marks thereon for comparison to the marks of the student's sheet being scored. A master sensing system is provided in the scoring machine to read the master sheet and generate electrical signals in response to the correct answer marks and thus establish the correct answer signal pattern. Complex logic circuitry is then required to receive the signals from the respective sensing systems and compare the patterns thereof to determine correspondence therebetween as an indication of the correctness of the answers. In other systems, the master answer sheet and associated sensing system are eliminated, while the logic circuitry is elaborately arranged to be programmed for the correct answers.

Conventional scoring systems are thus such as to entail the use of relatively complex and elaborate automatic test scoring machines. The high initial cost of these machines is prohibitive upon their purchase by a large number of economically disadvantaged school systems, and other users.

SUMMARY OF THE INVENTION

The present invention relates to an improved test answer sheet and method of automatically scoring same, which by virtue of their arrangement facilitate the use of extremely simple relatively inexpensive automatic scoring apparatus.

In the accomplishment of the foregoing, an answer sheet in accordance with the present invention generally comprises a sheet of paper, or equivalent inexpensive material, having a plurality of sets of pluralities of answer mark indicative areas designated thereon with a predetermined one of the areas of each set having conductive material extending entirely through the sheet. The mark indicative areas are arranged to be all similar in appearance such that the conductive area of each set cannot be ascertained by the student.

In accordance with a test scoring method utilizing the sheet, a student records his choice of answers by punching through his selection of mark indicative areas. The conductive areas are predetermined to correspond to correct answers such that when a correct answer is selected the conductive area of a set is punched through. Selection of an incorrect answer, or nonselection of an answer, results in retention of the conductive area. Scoring of a punch marked sheet is then accomplished by simply detecting and counting the conductive areas remaining in the sheet, whereby the total count is representative of the number of incorrect answers. Thus, no comparison of the answer sheet to a pattern of correct answers is involved in the scoring method and complex comparison and logic circuitry is not required in the scoring apparatus. Scoring apparatus for detecting and counting the conductive areas may be thus made extremely simple and inexpensive.

BRIEF DESCRIPTION OF THE DRAWINGS

FIG. 1 is a perspective view of an answer sheet in accordance with the present invention.

FIG. 2 is a sectional view taken at line 2—2 of FIG. 1.

FIG. 3 is a fragmentary side sectional view of a modified form of answer sheet.

FIG. 4 is a view similar to FIG. 3, but of another modified form of answer sheet.

FIG. 5 is a schematic presentation depicting the manner in which answers are marked on the sheet.

FIG. 6 is a transverse sectional view through the sheet depicting a correct answer mark.

FIG. 7 is a view similar to FIG. 6, but depicting an incorrect answer mark.

FIG. 8 is a schematic diagram of apparatus that may be employed to conduct a test scoring method in accordance with the invention utilizing the answer sheet.

DETAILED DESCRIPTION OF THE INVENTION

Referring now to FIG. 1 in detail, there is shown a test answer sheet 11 in accordance with the present invention which comprises a flat sheet 12 of paper, or equivalent inexpensive penetrable material, having a plurality of sets 13 of pluralities of answer mark indicative areas 14 designated thereon. For example, the mark indicative areas may be provided as dots of ink, or the like, imprinted or otherwise provided on the sheet in longitudinally spaced transverse rows, each row of dots thereby comprising a set 13. In the illustrated case, five dots respectively designated a—e inclusive are provided in each row, and the rows are numerically designated from one to a convenient number, such as 50 or 100. Each numerically designated row thus corresponds to a test question presented upon a separate test sheet, or by a teacher, and the dots correspond to different possible answers to the question. To answer a question, a student marks a dot area, in a manner subsequently described, which corresponds to his choice of possible answers to a question.

In accordance with the particularly salient aspects of the inventive answer sheet 11, an electrically conductive path or region 16 is provided to extend entirely through the sheet at one of the areas 14 of each set 13 (i.e., at one dot of each row). In the illustrated case, a conductive region 16 is provided at the c dot of row 1, as shown in FIG. 2. The mark indicative dots, or other areas 14, are arranged to be all similar in appearance such that a student cannot ascertain which area of each set is conductive. Each conductive region 16 and associated area may, for example, be formed of electrically conductive ink penetrating the entire thickness of the sheet, while the remaining areas of each set may be marked with similarly appearing nonconductive ink.

Although the answer sheet 11 of the present invention may be provided with flat surfaces, in some instances advantages are to be gained by the provision of raised regions on the surfaces of the sheet. For example, as shown in FIG. 3, the face surfaces of the sheet 12 may be molded, or otherwise formed with opposed raised portions 17 in the mark indicative areas 14. In this case, each conductive ink or other conductive region 16 extends through an opposed pair of the raised portions 17.

As shown in FIG. 4, the sheet 12 may be embossed to provide embossments 18 and 19 on the opposite face surfaces thereof. The embossments 18 are provided at the mark indicative areas 14, while the embossments 19 on the opposite face surface are provided in longitudinally staggered relation to the embossments 18. Each conductive region 16 then extends obliquely through the sheet from an embossment 18 to a staggered embossment 19.

With any of the forms of answer sheet 12 of the present invention hereinbefore described, it is of importance to note that in each set 13 of mark indicative areas 14, the area associated with a conductive region 16 is predetermined to correspond to a correct answer to the question which corresponds to the particular set. Various patterns of conductive regions may be provided on the sheet, and the sheets may be appropriately coded to enable a teacher, or other user, to ascertain the locations of the correct answer regions and thereby facilitate the design of a test.

In accordance with a novel test scoring method of the invention utilizing the answer sheet 11, a student marks his choice of answers to a question on the sheet by perforating the corresponding area 14 of a set thereof representing the possible answers to the question, with a stylus 21 or equivalent implement, as shown in FIG. 5. If the correct answer area of the set is perforated, the associated conductive region is punched out such that only a hole 22 remains and the set is devoid of a conductive region, as shown in FIG. 6. If an incorrect answer area of the set is perforated, a hole 22 is again formed in the sheet but the conductive region 16 of the set remains as shown in FIG. 7. Thus, when the entire sheet has been marked, conductive regions remain in those sets 13 of mark indicative areas 14 corresponding to questions which have been incorrectly answered. Likewise, a conductive region remains in each set 13 which corresponds to a question that has not been answered at all.

Scoring of a sheet marked in the manner just described may be thus simply accomplished by detecting or sensing, and counting the conductive regions 16 remaining in the sheet as an indication of the number of incorrect answers. Thus, a perfect score corresponds to a count of zero. If desired, the number of counts detected may be automatically subtracted from the number of counts corresponding to a perfect score to thereby provide a direct indication of the correct answer score. It is particularly important to note that scoring of the answer sheet is consequently accomplished without requirement of complex master answer sheet comparison arrangements or logic circuitry.

In order to detect the conductive regions in the answer sheet, the sheet may be passed between a pair of conductive members connected in an electrical circuit arranged to impress a potential therebetween. Each conductive region of the sheet in contacting the conductive members thus functions as a switch which closes the circuit and causes a flow of current therein. Conductive regions of the sheet are thus indicated by current flow in the circuit. More particularly, the conductive members may be provided as a plate 23 and a roller 24 bearing thereagainst, as shown in FIG. 8. The roller is preferably of a sufficient length to extend transversely across an entire set 13 of mark indicative areas 14 as the sheet is moved longitudinally between the roller and plate. The roller diameter is sufficiently small that it does not bridge longitudinally adjacent sets of the mark indicative areas. The roller consequently engages each set, one set at a time as the sheet is moved thereunder. Any conductive region remaining in a set momentarily closes a circuit through the sheet upon contacting the roller and plate during transit of the sheet therebetween. It will be appreciated that contact between the conductive regions and roller and plate is enhanced where the answer sheet embodiments of FIG. 3 and 4 are employed, by virtue of the raised or embossed portions thereof causing the mark indicative areas to be more intimately compressed between the roller and the plate.

A circuit herein current flow is established responsive to conductive regions 16 of an answer sheet contacting the plate 23 and roller 24 may be variously provided. For example, a potential source 26 and actuating coil 27 of a relay 28 may be serially connected between a conductive brush 29 in contact with roller 24, and ground. The plate 23 is then connected to ground to complete the circuit. Consequently, each time a conductive region 16 bridges the roller and plate, current flows through the circuit, and therefore through the relay coil 27. A normally open contactor 31 of the relay 28 is responsively closed each time current flows through the coil. Each closure of the contactor is indicative of the presence of a conductive region in the answer sheet and thus of an incorrect answer, and detection or sensing thereof is consequently accomplished.

Counting of the conductive regions 16 detected in the answer sheet may be accomplished by counting the number of impulses of current flowing through the circuit associated with the plate 23 and roller 24. To this end, closures of relay contactor 31 may be employed to generate corresponding current impulses for counting by a counter 32, such as a stepping switch, countercircuit, or the like. More particularly, a potential source 33 and the contactor 31 are connected in the input circuit of the counter 32 such that a current impulse is applied thereto in response to each closure of the contactor. Each impulse is registered by an accumulative count indicator 34 driven by the counter, whereby the total count indicated subsequent to scanning of the answer sheet by transit thereof between the roller and plate corresponds to the number of conductive regions 16 remaining in the sheet, and therefore the incorrect answers. As previously noted, the count may be subtracted from the count which corresponds to a perfect score in order to provide a direct indication of the correct answer score. For example, the count indicator 34 may be of the backward counting variety wherein the indicator is initially set for a full count and each count incrementally drives the indicator in a direction of decreasing count to thereby effect subtraction.

It will be appreciated that the scoring apparatus depicted in FIG. 8 and hereinbefore described which merely involves a simple detecting and counting arrangement to accomplish automatic scoring is of an extremely simple and inexpensive nature. Thus, the answer sheet and scoring method of the present invention facilitate automatic test scoring at a very small fraction of the cost incurred with existing scoring machines and methods.

I claim:

1. An answer sheet for automatic test scoring comprising a sheet of penetrable material having a plurality of sets of pluralities of similarly appearing answer mark indicative areas designated thereon, and an electrically conductive region extending entirely through said sheet at only one of said areas of each of said sets thereof, the area of each set associated with said conductive region being representative of a correct answer to a test question and the remaining areas of the same set being representative of incorrect answers.

2. An answer sheet according to claim 1, further defined by said conductive regions being of electrically conductive ink.

3. An answer sheet according to claim 1, further defined by said answer mark indicative areas being dots and said sets being longitudinally spaced rows of dots extending transversely of said sheet, only one dot of each row being of electrically conductive ink penetrating the thickness of said sheet to define an electrically conductive region extending entirely therethrough at said one dot of each row, the remaining dots of each row being designated with electrically nonconductive ink of similar appearance as said conductive ink.

4. An answer sheet according to claim 1, further defined by said sheet having opposed raised portions on the opposite face surfaces thereof in said mark indicative areas, each of said conductive regions extending through an opposed pair of said raised portions.

5. An answer sheet according to claim 1, further defined by said sheet having embossments on one face surface thereof at said mark indicative areas, said sheet having embossments on the opposite face surface thereof in longitudinally staggered relation to said embossments on said first face surface, each of said conductive regions extending obliquely through said sheet from an embossment on said first surface to a staggered embossment on said opposite surface.

6. A test scoring method comprising the steps of providing an answer sheet having a plurality of sets of pluralities of answer mark indicative areas designated thereon with an electrically conductive region extending entirely through the sheet at only one of the areas of each set, predetermining the area of each set associated with said conductive region to be representative of a correct answer to a test question and the remaining areas of the same set to be representative of incorrect answers, perforating said sheet at one selected area of each set to mark an answer to a question corresponding to said set to thereby remove the conductive region therefrom when a correct answer is marked, detecting the conductive regions remaining in said sheet, by closing an electrical circuit with each conductive region to responsively generate an electrical impulse in said circuit, and counting the detected conductive regions as an indication of the number of incorrect answers.

7. A test scoring method according to claim 6, further defined by subtracting the count of said detected conductive regions from a number of counts corresponding to a perfect score to provide a direct indication of the correct answer score.

8. A test scoring method according to claim 6, wherein detecting the conductive regions comprises closing an electrical circuit with each conductive region to responsively generate an electrical impulse in said circuit, and counting the detected regions comprises counting said electrical impulses.

9. A test scoring method according to claim 8, further defined by closing an electrical circuit with each conductive region comprising providing a pair of opposed conductive members in said circuit together with a potential source impressing a potential between said conductive members, and passing said sheet between said members in a direction from set to set of said mark indicative areas to momentarily contact each remaining one of said conductive regions with said members and thereby close said circuit to effect current flow therein through said conductive region and generate said impulse.

10. A test scoring method according to claim 8, further defined by subtracting the count of said electrical impulses from a number of counts corresponding to a perfect score to provide a direct indication of the correct answer score.